(12) United States Patent
Nishikawa et al.

(10) Patent No.: US 7,070,137 B2
(45) Date of Patent: Jul. 4, 2006

(54) HANDLE ASSEMBLY FOR A SPINNING REEL

(75) Inventors: Tomohiro Nishikawa, Osaka (JP); Koji Ochiai, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/751,889

(22) Filed: Jan. 7, 2004

(65) Prior Publication Data

US 2004/0140385 A1 Jul. 22, 2004

(30) Foreign Application Priority Data

Jan. 20, 2003 (JP) ............................. 2003-010814

(51) Int. Cl.
*A01K 89/01* (2006.01)
(52) U.S. Cl. .................. 242/282; 242/283; 74/545
(58) Field of Classification Search ................ 242/282, 242/283, 284; 74/545
See application file for complete search history.

(56) References Cited

U.S. PATENT DOCUMENTS

| | | | | |
|---|---|---|---|---|
| 5,150,853 A | * | 9/1992 | Bernard et al. ............. | 242/283 |
| 5,292,087 A | * | 3/1994 | Sato ............................ | 242/268 |
| 5,295,640 A | * | 3/1994 | Kawabe ...................... | 242/248 |
| D388,860 S | * | 1/1998 | Iwabuchi .................... | D22/141 |
| 5,984,220 A | * | 11/1999 | Kawabe ...................... | 242/241 |
| 6,626,385 B1 | | 9/2003 | Tsutsumi | |
| 2002/0096587 A1 | * | 7/2002 | Ikuta .......................... | 242/319 |
| 2003/0146319 A1 | * | 8/2003 | Iwabunchi et al. ......... | 242/231 |

FOREIGN PATENT DOCUMENTS

| | | |
|---|---|---|
| FR | 1027031 A | 5/1953 |
| JP | 2001-231414 A | 8/2001 |
| JP | 2003-079287 A | 7/2003 |

* cited by examiner

*Primary Examiner*—Kathy Matecki
*Assistant Examiner*—Evan H. Langdon
(74) *Attorney, Agent, or Firm*—Shinjyu Global IP Counselors

(57) ABSTRACT

A handle assembly is detachably screwed onto a master gear shaft, on which a master gear is provided. The handle assembly includes an approximately T-shaped handle grip, a handle arm on which the handle grip is rotatively mounted, and a handle shaft on which the base of the handle arm is mounted. The handle shaft has a three piece structure including a tubular main shaft unit, a first shaft portion that is screwed onto one end of the main shaft unit and the master gear shaft, and a second shaft portion that is mounted on the other end of the main shaft unit and the base of the handle arm. In a screw type handle assembly for a spinning reel, it is possible to maintain rigidity of the handle shaft at a high level while reducing the overall weight of the handle shaft.

24 Claims, 11 Drawing Sheets

HANDLE ASSEMBLY FOR A SPINNING REEL

BACKGROUND OF THE INVENTION

1. Field of the Invention

The present invention generally relates to a handle assembly, and more particularly to a handle assembly that is detachably mounted to a master gear shaft of a spinning reel.

2. Background Information

A spinning reel generally includes a reel unit which has a handle assembly and is mounted to a fishing rod, a spool around which fishing line is wound and which is mounted to the reel unit such that the spool can move forward and backward, a rotor that is rotatively supported on the reel unit and which winds the fishing line around the spool, and a rotation transmission mechanism that transmits the rotation of the handle assembly to the rotor.

The rotation transmission mechanism includes a master gear, a master gear shaft that is provided on the master gear, and a pinion gear that meshes with the master gear. The rotor is connected to the front portion of the pinion gear.

The handle assembly includes a handle shaft, a handle arm that extends from the handle shaft in the radial direction, and a handle grip that is mounted to the tip of the handle arm. The handle shaft maybe mounted from either the left or the right end of the master gear shaft. The handle assembly may for example be the screw type (see for example Japanese Patent Application Publication No. 2001-231414) because the handle assembly may be mounted on either the left or right end of the master gear shaft.

With the screw type of handle assembly, there will be little jerkiness between the handle shaft and the master gear shaft and the durability thereof will improve because the handle assembly is connected by screwing the handle shaft onto the master gear shaft. With the master gear shaft that serves to mount this type of screw type handle assembly, two types of male threaded portions (large and small) are sequentially formed in the axial direction on the end of the master gear, such that these male threaded portions have different screw directions.

With this type of screw type handle assembly, it is well known to form the handle arm from an aluminum alloy in order to reduce the overall weight thereof, and to form the handle shaft from a stainless steel alloy in order to maintain a high degree of rigidity.

With the aforementioned conventional screw type handle assembly, the overall weight thereof can be reduced because the handle arm is formed from an aluminum alloy. In addition, it is thought that the overall weight of the handle assembly can be reduced by forming the handle shaft from an aluminum alloy. However, when the handle shaft is formed from an aluminum alloy, the rigidity of the handle shaft may decline compared to that of a handle shaft made of a stainless steel alloy. In particular, when the screw portion of the handle shaft is formed from an aluminum alloy, the screw portion may easily break, and an oxidized film may form on the screw surface and will easily corrode and damage the same.

In view of the above, it will be apparent to those skilled in the art from this disclosure that there exists a need for an improved handle assembly for a spinning reel that overcomes the above-described problems of the conventional handle assemblies. This invention addresses this need in the art as well as other needs, which will become apparent to those skilled in the art from this disclosure.

SUMMARY OF THE INVENTION

An object of the present invention is to, in a screw type handle assembly for a spinning reel, maintain rigidity of the handle shaft at a high level while reducing the overall weight of the handle shaft.

The handle assembly for a spinning reel in accordance with a first aspect of the present invention is a handle assembly that is detachably screwed onto a master gear shaft of the spinning reel, and includes a handle shaft, a handle arm, and a handle grip. The handle shaft can be detachably screwed onto the tip of the master gear shaft and is concentrically disposed with the master gear shaft when mounted thereon. The handle arm extends from the handle shaft. The base end of the handle arm is mounted to the handle shaft. The handle grip is rotatively mounted to the tip of the handle arm so as to be rotatable around an axis that is approximately parallel to the handle shaft. The handle shaft includes a tubular main shaft unit, a first shaft portion that is adapted to be mounted to one end of the main shaft unit and the tip of the master gear shaft, and a second shaft portion that is adapted to be mounted to the other end of the main shaft unit and the base end of the handle arm.

With this handle assembly, the handle shaft includes a tubular main shaft unit in which a space is formed in the interior thereof, and a first shaft portion and a second shaft portion that are mounted to the master gear shaft and the handle arm. Here, the handle shaft is formed with a space in the interior of the main shaft unit, and thus the handle shaft can be made lighter than a solid handle shaft. In addition, the handle shaft has a three piece structure that includes the main shaft unit, the first shaft portion, and the second shaft portion. Thus, for example, by forming the main shaft unit from a light weight material and forming the first shaft portion and the second shaft portion, to which comparatively strong forces are applied, from a high strength material, the rigidity of the handle shaft can be maintained at a high level while reducing the overall weight of the handle shaft.

The handle assembly in accordance with a second aspect of the present invention is the handle assembly according to the first aspect, in which the main shaft unit is made of an aluminum alloy. Here, the formation of the main shaft unit can be simplified, and the weight thereof can be reduced due to the use of a comparatively light aluminum alloy.

The handle assembly in accordance with a third aspect of the present invention is the handle assembly according to the first or second aspect, in which the first shaft portion and the second shaft portion are made of stainless steel. Here, the rigidity of the first and second shaft portions can be maintained at a high level because they are formed from a high strength material.

The handle assembly in accordance with a fourth aspect of the present invention is the handle assembly according to any of the first through third aspects, in which the first shaft portion and the second shaft portion are coupled to the main shaft unit. Here, the detachment of the first shaft portion and the second shaft portion from the main shaft unit is simplified.

The handle assembly in accordance with a fifth aspect of the present invention is the handle assembly according to any of the first through fourth aspects, further including a tubular cover member having a bottom portion. The bottom portion is mounted to the second shaft portion so as to be axially non-movable relative to the second shaft portion. Here, the design can be improved, and the main shaft unit, the first shaft unit, and the second shaft unit can be protected.

The handle assembly in accordance with a sixth aspect of the present invention is the handle assembly according to the fifth aspect, in which the cover member includes slits that are formed along the axial direction of the cover member. Here, the design can be improved, and the weight can be reduced.

The handle assembly in accordance with a seventh aspect of the present invention is the handle assembly according to the sixth aspect, in which the slits are spaced apart in the circumferential direction of the cover member and provided in a plurality of positions. Here, the weight of the cover member can be further reduced.

The handle assembly in accordance with an eighth aspect of the present invention is the handle assembly according to any of the fifth through seventh aspects, in which the cover member is made of an aluminum alloy. Here, the design of the cover member can be further improved.

The handle assembly in accordance with a ninth aspect of the present invention is the handle assembly according to any of the fifth through seventh aspects, in which the cover member is made of a synthetic resin. Here, the weight of the cover member can be further reduced.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A spinning reel in which a first embodiment of the present invention has been employed is a reel that is mounted on a fishing pole and winds a fishing line around an axis that is parallel to the axis of the fishing pole. The spinning reel includes a reel unit 2 that includes a handle assembly 1, a rotor 3, and a spool 4. The rotor 3 is rotatively supported on the front portion of the reel unit 2, and serves to wind fishing line around the spool 4. The spool 4 has fishing line wound around the outer peripheral surface thereof, and is disposed on the front portion of the rotor 3 so that the spool 4 is movable forward and backward.

Figure 2:
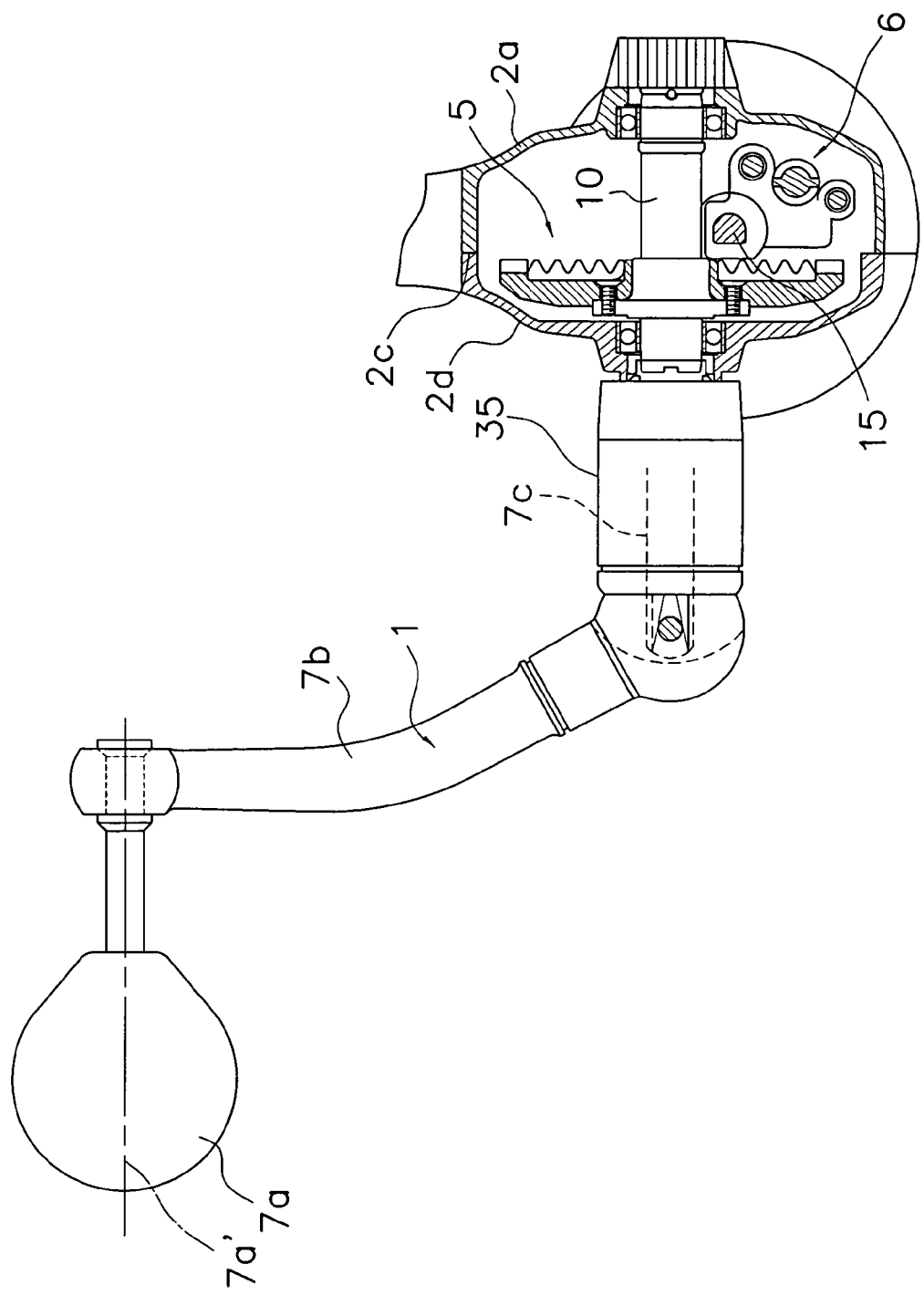
FIG. 2 is a cross-sectional view of the spinning reel in accordance with the first embodiment of the present invention, viewed along II—II in FIG. 1.

As shown in FIG. 2, the handle assembly 1 is detachably screwed onto a master gear shaft 10 on which a master gear 11 is provided. The handle assembly 1 includes an approximately T-shaped handle grip 7a, a handle arm 7b on which the handle grip 7a is rotatively mounted on the tip thereof, and a handle shaft 7c on which the base end of the handle arm 7b is mounted.

Figure 4:
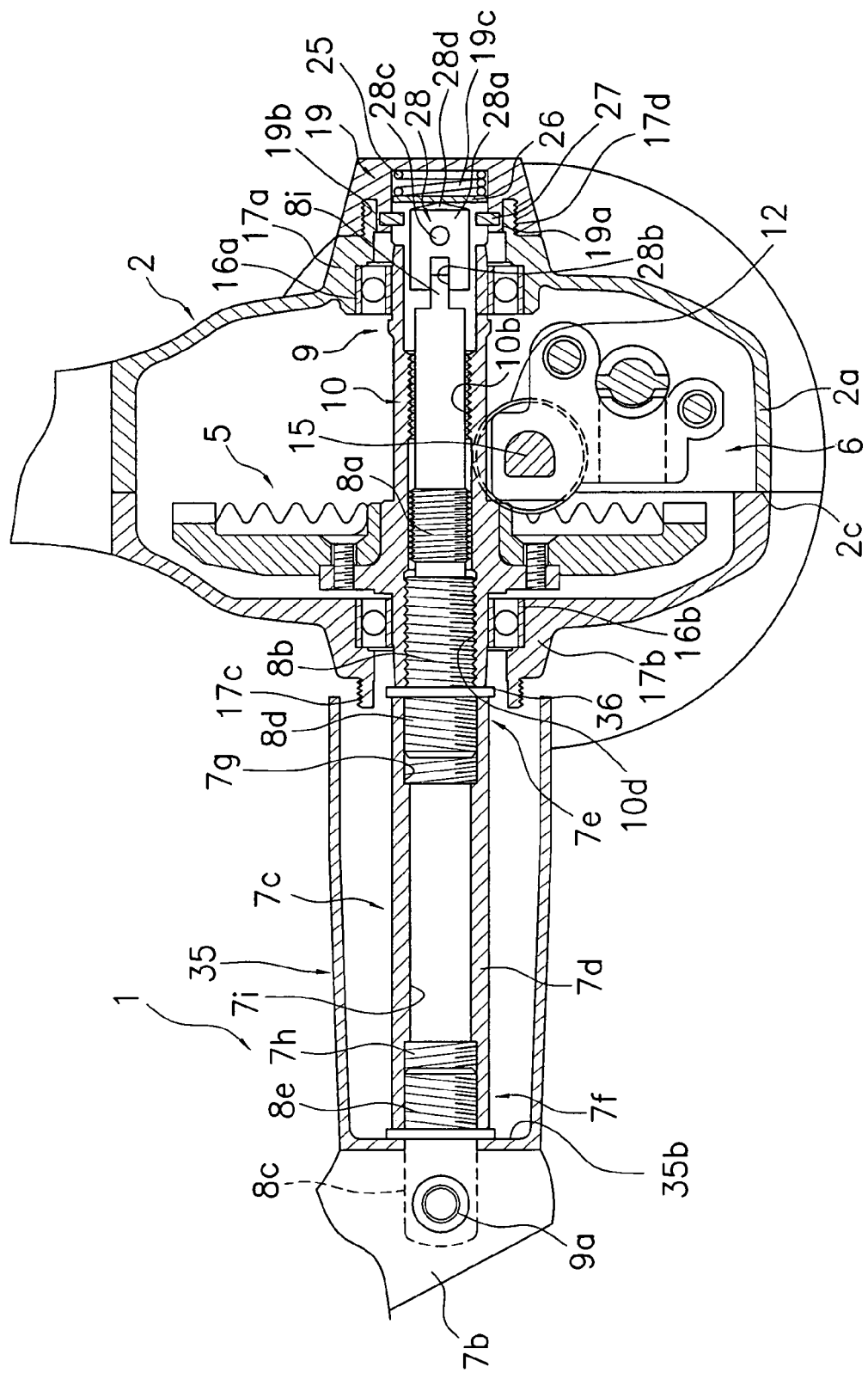
FIG. 4 is a cross-sectional view of the spinning reel in accordance with the first embodiment of the present invention, viewed along IV—IV in FIG. 2.

As shown in FIG. 2, the handle grip 7a is rotatively mounted on the tip of the handle arm 7b so that the handle grip 7a revolves around an axis 7a' that is approximately parallel to the handle shaft 7c. The base end of the handle arm 7b is mounted to the handle shaft 7c, and extends in an approximate L-shape in a direction that is perpendicular to the axial center of the handle shaft 7c. As shown in FIG. 4, the handle shaft 7c is a cylinder shaped member that screws onto the master gear shaft 10. The handle shaft 7c is a three piece structure that includes a tubular main shaft unit 7d, a first shaft portion 7e that is screwed onto one end of the main shaft unit 7d and the master gear shaft 10, and a second shaft portion 7f that is mounted on the other end of the main shaft unit 7d and the base of the handle arm 7b.

Figure 7:
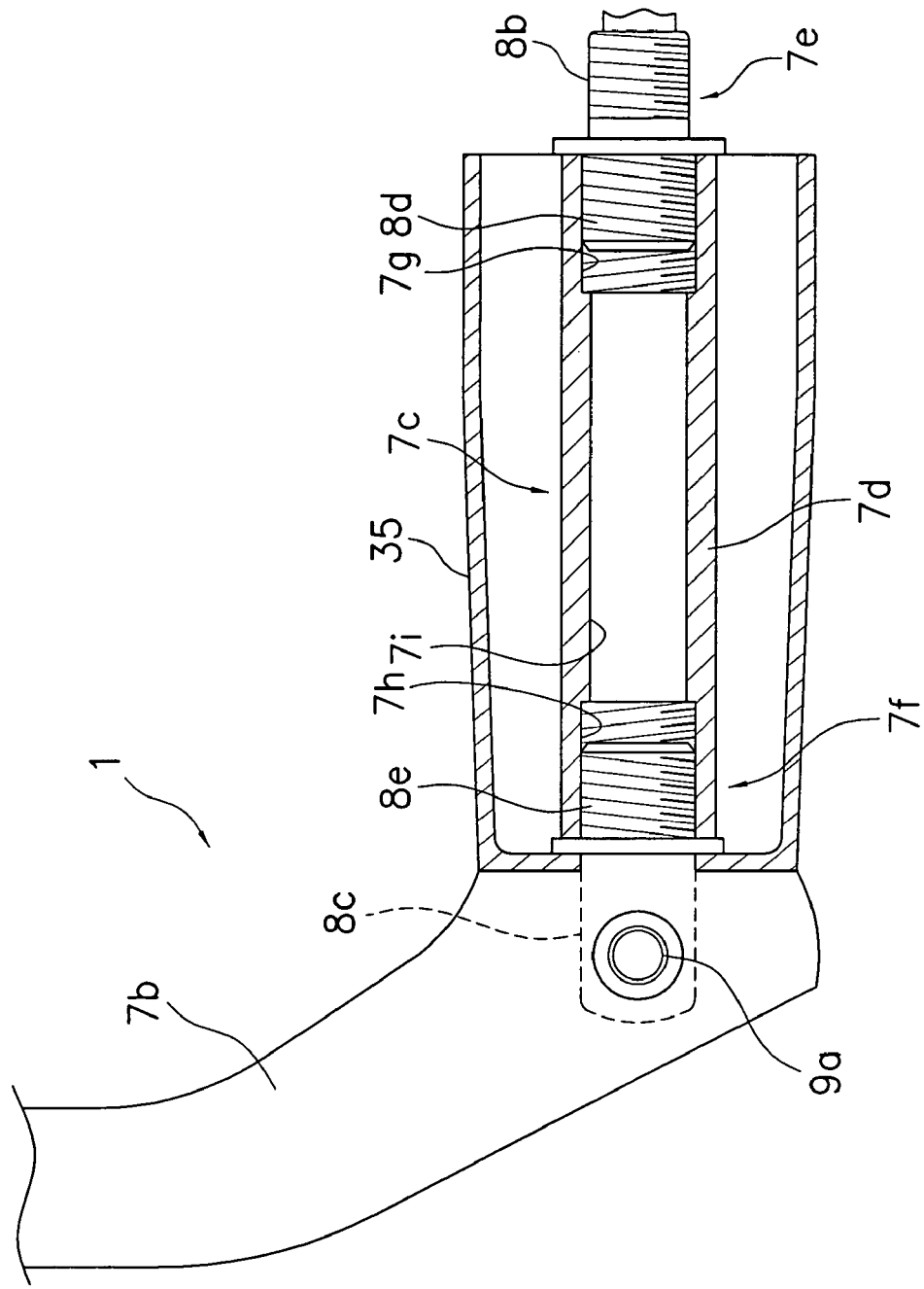
FIG. 7 is a cross-sectional view of the handle shaft of the spinning reel in accordance with the first embodiment of the present invention.

As shown in the enlarged view of FIG. 7, the main shaft unit 7d is a tubular member made of an aluminum alloy that is formed with a hollow space in the interior thereof. The main shaft unit 7d includes a third through hole 7i that passes through the interior of the main shaft unit 7d, and a third female threaded portion 7g and a fourth female threaded portion 7h that are respectively formed on the ends of the third through hole 7i. The first shaft portion 7e and the second shaft portion 7f are mounted onto the third female threaded portion 7g and the fourth female threaded portion 7h of the main shaft unit 7d by screwing a third male threaded portion 8d and a fourth male threaded portion 8e (described below) therein that are respectively formed on the first shaft portion 7e and the second shaft portion 7f.

The first shaft portion 7e is a shaft member made of a stainless steel alloy, and as shown in FIG. 4, includes a first engagement portion 8i that is formed on an end of the first shaft portion 7e, a first male threaded portion 8a and a second male threaded portion 8b that are formed on an intermediate portion of the first shaft portion 7e, and a third male threaded portion 8d that is formed on the base end of the first shaft portion 7e.

Figure 5:
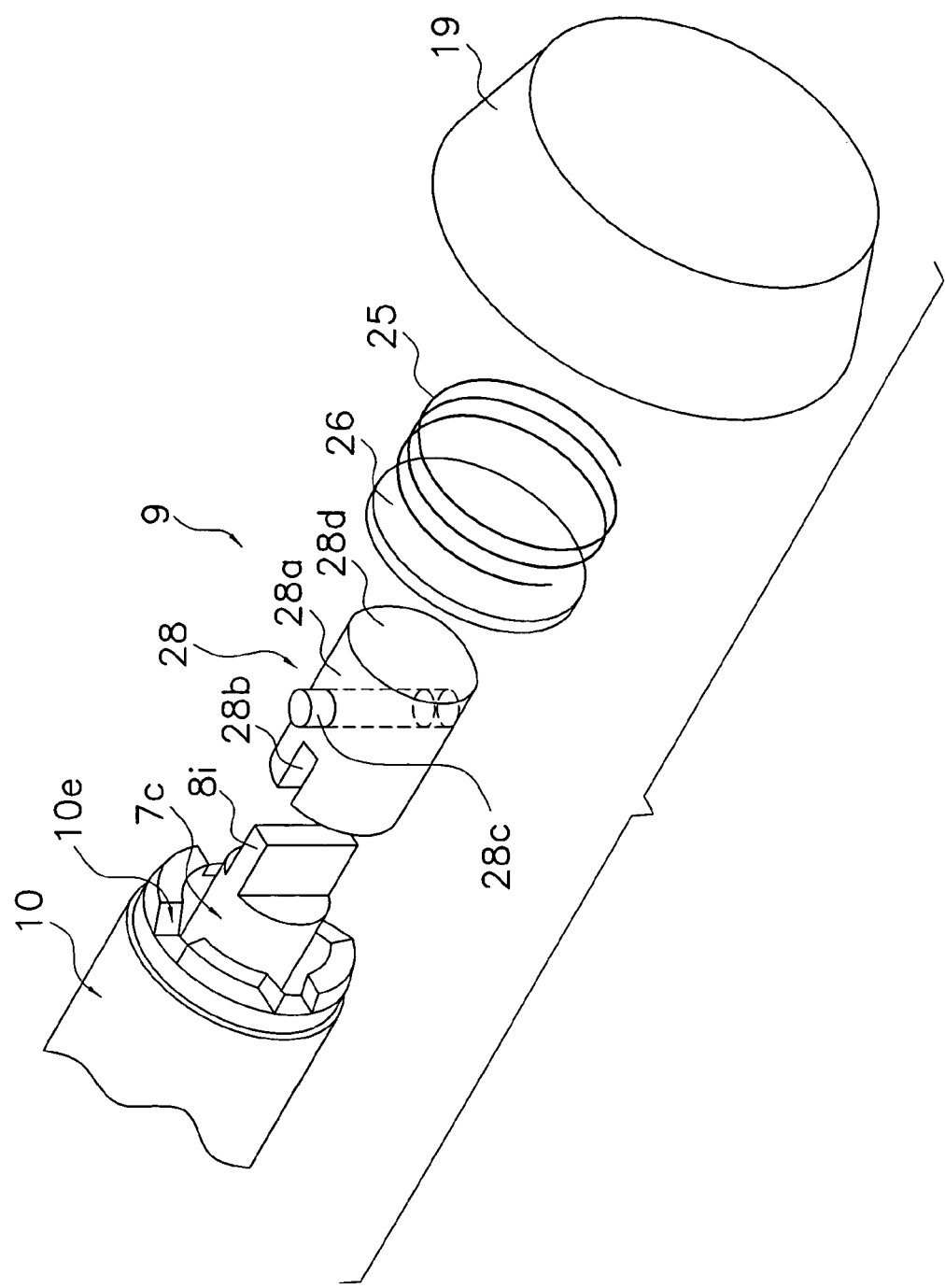
FIG. 5 is a perspective view of the handle attachment structure.

As shown in FIG. 4, the first engagement portion 8i is a projection formed at the end of the first shaft portion 73. As shown in FIG. 5, the first engagement portion 8i is formed by cutting apart a round bar, such that a central portion of the round bar remains as the projecting first engagement portion 8i and side portions are cut away. A locking member 28 (described below) is engaged with the first engagement portion 8i.

As shown in FIG. 4, a right screw (a screw that tightens when rotated in the clockwise direction) of the first male threaded portion 8a, and a left screw (a screw that tightens when rotated in the counterclockwise direction) of the second male threaded portion 8b that has a diameter larger than the first male threaded portion 8a, are concentrically formed in the axial direction in the intermediate portion of the first shaft portion 7e, and screw into the master gear shaft 10. As shown in FIGS. 4 and 7, the third male threaded portion 8d screws into the third female threaded portion 7g of the main shaft unit 7d and is formed on the base end of the first shaft portion 7e.

The second shaft portion 7f is a shaft member made of a stainless steel alloy, and as shown in FIGS. 4 and 7, includes a fourth male threaded portion 8e that is formed on the end portion of the second shaft portion 7f and screws into the fourth female threaded portion 7h of the main shaft unit 7d, and a cylindrically shaped base end 8c. The base end 8c is inserted into the base end of the handle arm 7b, and is fixed therein by means of a pin member 9a. This allows the handle arm 7b to be mounted and fixed to the handle shaft 7c.

As shown in FIGS. 2, 4 and 7, a tubular cover member 35 having a bottom portion 35b that is mounted around the periphery of the handle shaft 7c so as to be axially non-movable relative to the handle shaft 7c. The cover member 35 is made of an aluminum alloy or a synthetic resin, is mounted on the second shaft portion 7f so that the bottom portion of the cover member 35 is non-movable in the axial direction. The tip of the cover member 35 is disposed near the reel unit 2.

Figure 8:
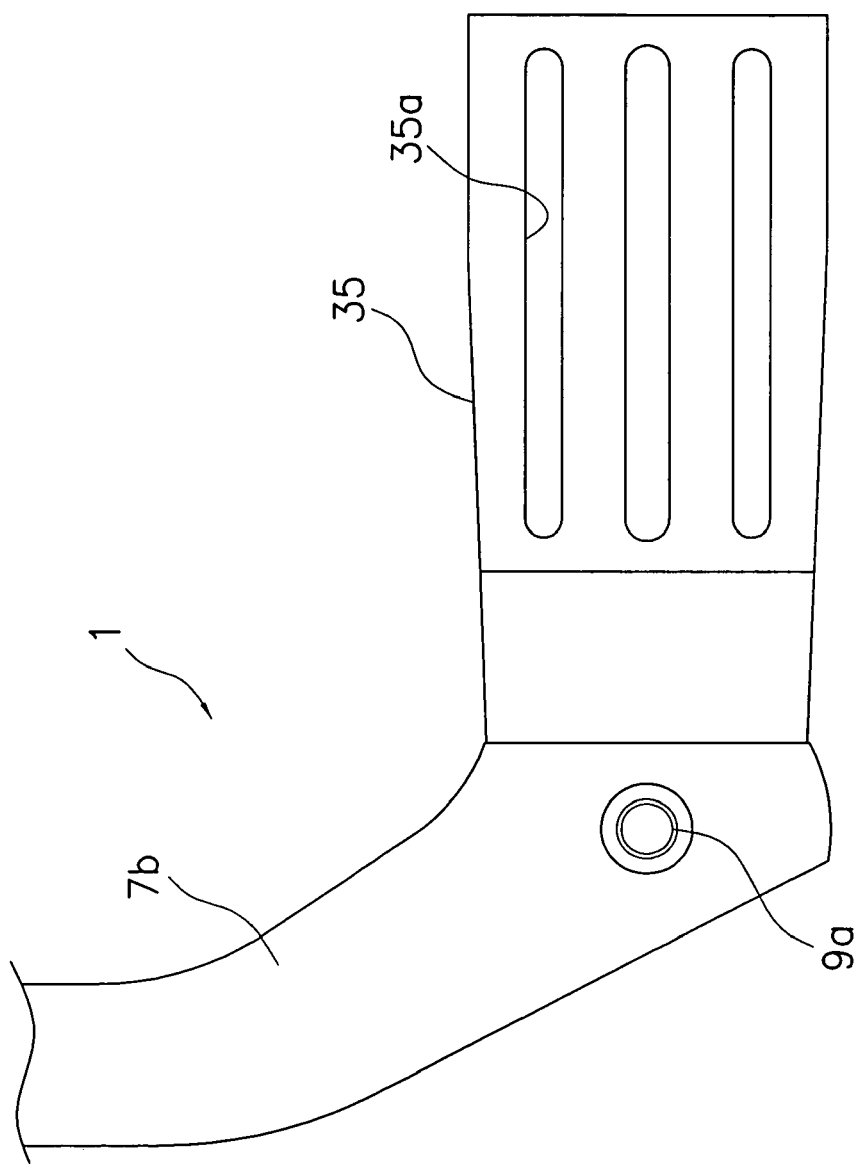
FIG. 8 is a side view of the handle shaft of the spinning reel in accordance with the first embodiment of the present invention.

As shown in FIG. 8, the cover member 35 includes slits 35a that are formed along the axial direction of the cover member 35. The slits 35a are provided in a plurality of positions and are spaced apart in the circumferential direction of the cover member 35. Here, when the cover member 35 is mounted on the handle shaft 7c, the main shaft unit 7d of the handle shaft 7c can be viewed from the outside of the cover member 35 through the slits 35a. Because of this, the design can be improved by, for example, providing different ornamental coatings on the cover member 35 and the main shaft unit portion 7d.

As shown in FIGS. 1 to 4, the reel unit 2 includes a reel body 2a that has an opening 2c on the left side of the reel body 2a, a T-shaped rod attachment leg 2b extending diagonally upward to the front from the reel body 2a and formed unitarily therewith, and a lid 2d that covers the opening 2c. The reel body 2a includes a space in the interior thereof. A rotor drive mechanism 5 that transmits the rotation of the handle assembly 1 to rotate the rotor 3 and an oscillation mechanism 6 for moving the spool 4 back and forth to uniformly wind fishing line onto the spool 4 are provided inside the space.

As shown on the right side of the reel body 2a in FIG. 4, a tubular boss 17a is formed. The boss 17a projects outward from the reel body 2a in order to accommodate a bearing 16a that supports the right end (as shown in FIG. 4) of the master gear shaft 10. A boss 17b is formed in a position that faces the boss 17a of the lid 2d. The boss 17b projects outward from the reel body 2a in order to accommodate a bearing 16b that supports the left end of the master gear shaft 10 (as shown in FIG. 4).

As shown in FIGS. 4 and 5, a cap member 19 is a cylindrical member whose outer shape is that of a truncated cone, and is screwed onto and fixedly but detachably coupled to either of male threaded portions 17c, 17d formed on the outer peripheral surfaces of the bosses 17a, 17b by a female threaded portion 19b formed inside a recessed portion 19a that is annularly formed in a central portion of an annular end surface of the cap member 19. Note that in FIG. 4, the handle assembly 1 is mounted from the left side, and thus the cap member 19 is screwed onto and fixedly coupled to the male threaded portion 17d on the right side. An accommodation space 19c is formed in the interior of the cap member 19, and accommodates a coil spring 25 and a disk shaped pressure member 26 that receives the biasing force of the coil spring 25. The pressure member 26 is disk shaped, and is prevented from falling out of the accommodation space 19c by a retaining ring 27 that is press fitted in the inner peripheral surface of the cap member 19. The coil spring 25 is mounted in the compressed state in the cap member 19, and pushes the pressure member 26 toward the retaining ring 27 even when the cap member 19 has been taken off.

The locking member 28 is mounted in between the pressure member 26 and the tip of the handle shaft 7c. The locking member 28 is provided in order to prevent the handle shaft 7c of the handle assembly 1 from becoming detached from the master gear shaft 10. As shown in FIGS. 4 and 5, the locking member 28 includes a cylindrical member unit 28a, a first engaged portion 28b that is formed in one end (the left end in FIG. 4) of the member unit 28a, a cylindrical second engaged portion 28c that passes through the member unit 28a, and a cone shaped contact portion 28d having a pointed tip that is formed on the other end (the right end in FIG. 4) of the member unit 28a. The first engaged portion 28b is formed with a groove-shaped recess that passes through the member unit 28a. The first engaged portion 28b is engaged with the first engagement portion 8i that projects outward from the tip of the handle shaft 7c so that the first engaged portion 28b is non-rotatable but movable in the axial direction relative to the first engagement portion 8i. The second engaged portion 28c engages with either the second engagement portion 10e or the third engagement portion 10f formed on the master gear shaft 10 (described below) so that the second engaged portion 28c is non-rotatable in the locking direction but movable in the axial direction with the second engagement 10e. The second engaged portion 28c passes through the center of the member unit 28a in the radial direction, such that both ends of the second engaged portion 28c project outward from the member unit 28a.

A rotor drive mechanism 5 includes a master gear shaft 10 on which the handle assembly 1 is non-rotatably mounted, a master gear 11 that is a face gear that rotates with the master-gear shaft 10, and a pinion gear 12 that meshes with the master gear 11. Both ends of the master gear shaft 10 are supported rotatively on the reel body 2a via the ball bearings 16a and 16b.

Figure 6:
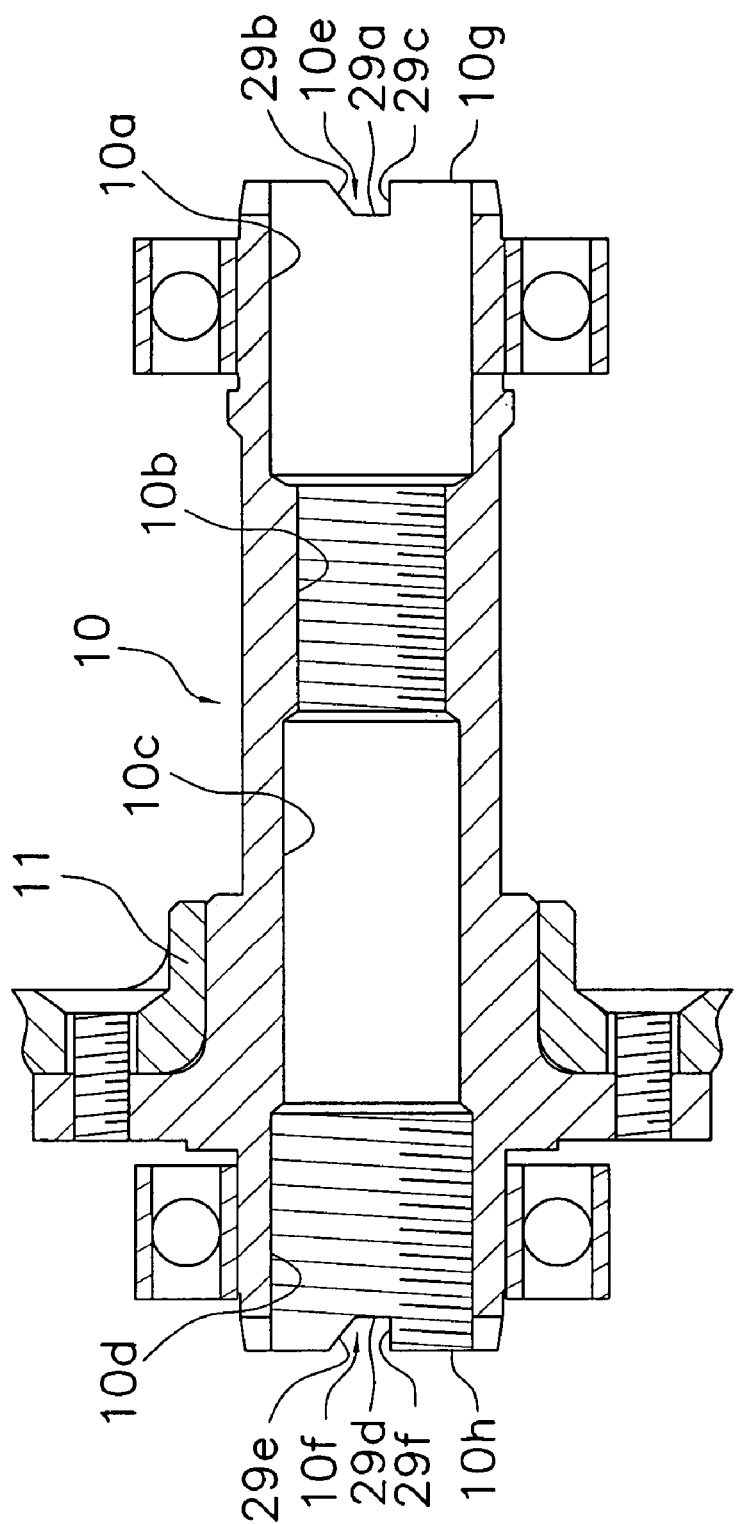
FIG. 6 is a cross-sectional view of the master gear shaft of the spinning reel in accordance with the first embodiment of the present invention.

As shown in the order from the right end (the right side of FIG. 6), a first through hole 10a, a first female threaded portion 10b, a second through hole 10c, and a second female threaded portion 10d that opens to the left end are concentrically formed along the axial direction in the central portion of the master gear shaft 10. The axial length of the first through hole 10a is formed to be approximately the same as the axial length of the second female threaded portion 10d. The diameter of the first through hole 10a is larger than that of the second female threaded portion 10d, and is formed such that the second male threaded portion 8b of the handle shaft 7c can be inserted therein. The first female threaded portion 10b is a right screw which screws onto the first male threaded portion 8a of the handle shaft 7c. The length of the first female threaded portion 10b in the axial direction is slightly longer than that of the first male threaded member 8a. The diameter of the second through hole 10c is larger than that of the first female threaded portion 10b, and is formed such that the first male threaded portion 8a can be inserted therein. The second female threaded portion 10d is a left screw which screws onto the second male threaded portion 8b of the handle shaft 7c.

A second engagement portion 10e and a third engagement portion 10f are formed on both ends of the master gear shaft 10. The second engagement portion 10e and the third engagement portion 10f are mirror images of each other, and engage with the second engaged portion 28c non-rotatively but movably in the axial direction. In other words, the second engagement portion 10e includes a recessed surface 29a that is recessed on the central side in the axial direction from a right end surface 10e (right side of FIG. 6) of the master gear shaft 10, a slanted surface 29b that extends from the downstream side of the recessed surface 29a in the direction in which the screw of the first female threaded portion 10b is tightened to the right end surface 10g, and a perpendicular surface 29c that is substantially perpendicular from the upstream side of the recessed surface 29b in the direction in which the screw of the first female threaded portion 10b is tightened. In addition, the third engagement portion 10f includes a recessed surface 29d that is recessed on the central side in the axial direction from a left end surface 10h (left side of FIG. 6) of the master gear shaft 10, a slanted surface 29e that extends from the downstream side of the recessed surface 29d in the direction in which the screw of the second female threaded portion 10d is tightened to the left end surface 10h, and a perpendicular surface 29f that is substantially perpendicular from the upstream side of the recessed surface 29d in the direction in which the screw of the second female threaded portion 10d is tightened. The second engagement portion 10e and the third engagement portion 10f are spaced apart on both end surfaces 10g, 10h in the rotational direction, and for example, four of these portions are formed on each end surface 10g, 10h.

Figure 3:
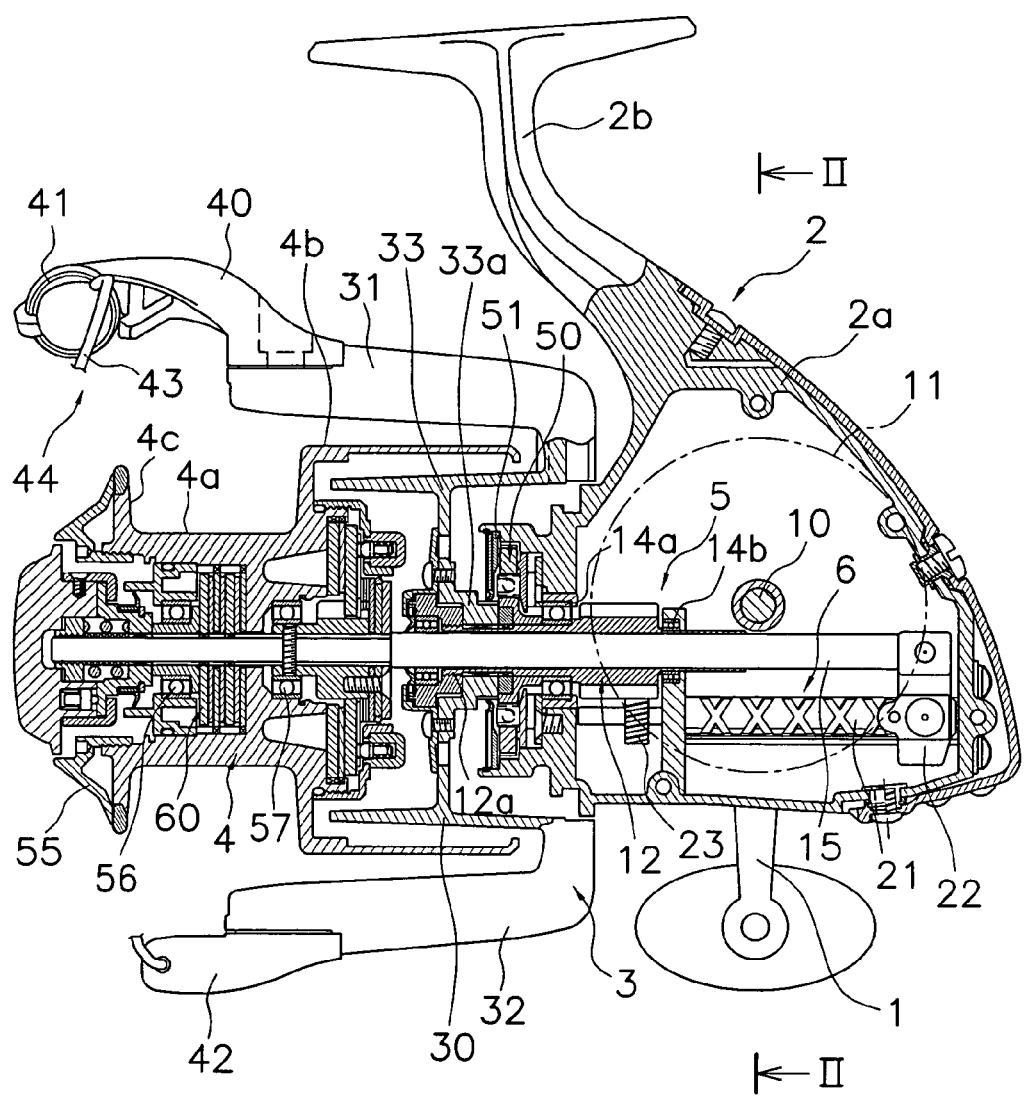
FIG. 3 is a lateral cross-sectional view of the left side of the spinning reel in accordance with the first embodiment of the present invention.

As shown in FIG. 3, the pinion gear 12 is fitted to the reel unit 2 so as to be rotatable along the axial direction of the fishing pole, and the front section 12a of the pinion gear 12 passes through the center of the rotor 3 and is fixedly coupled to the rotor 3 with a nut 13. The pinion gear 12 is rotatively supported on the reel unit 2 by bearings 14a and 14b at the center and rear, respectively, along the axial direction. The spool shaft 15 passes through the inside of this pinion gear 12. The pinion gear 12 meshes with the master gear 11 and with the oscillation mechanism 6. Rotor drive mechanisms are conventional components that are well known in the art. Therefore, their structures will not be discussed or illustrated further in detail herein.

The oscillating mechanism 6 serves to move the spool shaft 15 connected to the central portion of the spool 4 via a drag mechanism 60 forward and backward, and to move the spool 4 in the same directions. The oscillation mechanism 6 includes a worm 21 disposed substantially directly below and parallel to the spool shaft 15, a slider 22 that moves back and forth parallel to the worm 21, and a speed reduction mechanism 23 that reduces the speed of and transmits the rotation of the pinion gear 12 to the worm 21. The rear end of the spool shaft 15 is non-rotatably and fixedly coupled to the slider 22. Oscillating mechanisms are conventional components that are well known in the art. Therefore, their structures will not be discussed or illustrated in detail herein.

The rotor 3 includes a cylindrical portion 30, and first and second rotor arms 31, 32 that face each other and are provided on the sides of the cylindrical portion 30. The cylindrical portion 30 and the two rotor arms 31 and 32 can be made, for example, of an aluminum alloy, and are formed unitarily. A front wall 33 is formed at the front of the cylindrical portion 30, and a boss 33a is formed in the center of the front wall 33. A through hole in which the pinion gear 12 is non-rotatably engaged is formed in the central portion of the boss 33a, and a front portion 12a of the pinion gear 12 and a spool shaft 15 pass through this through hole.

The first rotor arm 31 extends outward from the cylindrical portion 30 and then curves and extends forward, and the section that connects with the cylindrical portion 30 expands and curves along the circumferential direction of the cylindrical portion 30. A first bail support member 40 is pivotably mounted to the outer peripheral side of the front end of the first rotor arm 31. A line roller 41 for guiding fishing line around the spool 4 is mounted to the front end of the first bail support member 40.

The second rotor arm 32 extends outward from the cylindrical portion 30 and then curves and extends forward. A second bail support member 42 is pivotably mounted to the outer periphery of the tip of the second rotor arm 32.

A bail 43 is a wire member curved into an approximate U-shape and is fixedly held between the line roller 41 and the second bail support member 42. The first and second bail support members 40 and 42, the line roller 41 and the bail 43 form a bail arm 44 that guides the fishing line to the spool 4. The bail arm 44 can pivot between a line-guiding posture shown in FIG. 3 and a line-releasing posture which flips from the line-guiding posture. Rotors are conventional components that are well known in the art. Therefore, their structures will not be discussed or illustrated in detail herein.

A reverse rotation prevention mechanism 50 for preventing the reverse rotation of the rotor 3 is provided within the cylindrical portion 30 of the rotor 3. The reverse prevention mechanism 50 includes a one-way clutch 51 with an inner ring that freely rotates. Reverse rotation mechanisms are conventional components that are well known in the art. Therefore, their structures will not be discussed or illustrated in detail herein.

The spool 4 is disposed between the first rotor arm 31 and second rotor arm 32 of the rotor 3, and is mounted to the tip of the spool shaft 15 with a drag mechanism 60 interposed therebetween. The spool 4 includes a line-winding bobbin 4a around an outer periphery of which fishing line is wound, a skirt 4b formed unitarily with the rear portion of the line-winding bobbin 4a, and a flange plate 4c fixedly formed at the front end of the line-winding bobbin 4a. The line-winding bobbin 4a is a straight, cylindrical member and the circumferential surface thereof is configured to be parallel with the spool shaft 15. The line-winding bobbin 4a is rotatively mounted to the spool shaft 15 via two bearings 56, 57. Spools are conventional components that are well known in the art. Therefore, their structures will not be discussed or illustrated in detail herein.

Next, the handling and operation of the reel will be described.

Figure 1:
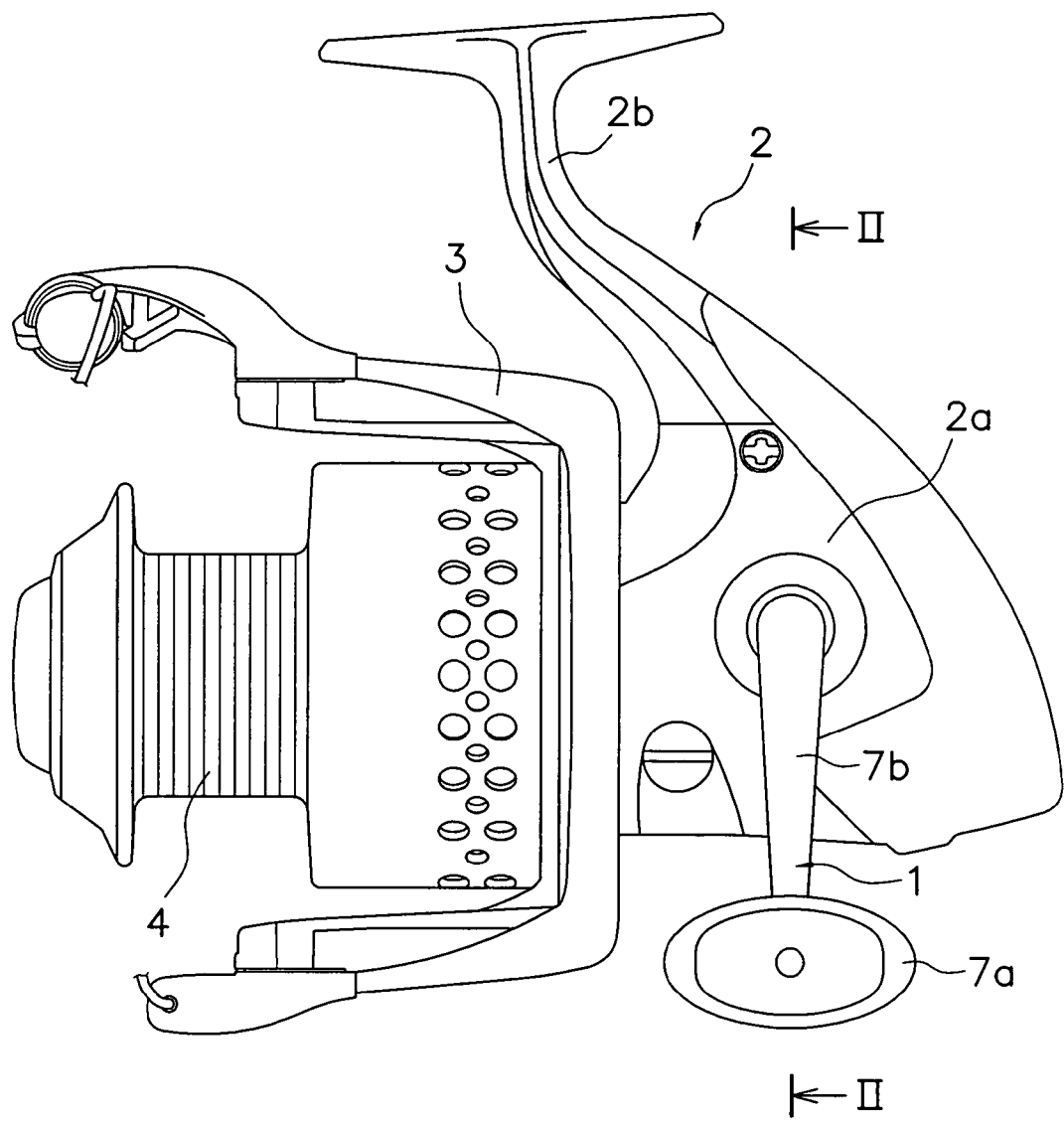
FIG. 1 is a left-side view of a spinning reel in accordance with a first embodiment of the present invention.

When fishing, there will be times when one wants to change the position in which the handle assembly 1 is mounted. For example, as shown in FIGS. 1, 2 and 4, there are many times during lure fishing or cast fishing that the handle assembly 1 will be mounted on the left side of the reel unit 2 in order to operate the fishing rod with one's left hand. Similarly, as shown in FIG. 3, there will also be many occasions when the handle assembly 1 is mounted on the right side so that one may operate the handle assembly 1 with their right hand. The left/right mounting position of the handle assembly 1 differs according to individual preference.

When the mounting position of the handle assembly 1 is to be changed from the left position shown in FIG. 4 to the right position shown in FIG. 3, the cap member 19 is removed from the boss 17a and the locking member 28 is taken out. This allows the handle assembly 1 to rotate relative to the master gear shaft 10. When the handle assembly 1 rotates clockwise in this state, the reverse rotation of the rotor 3 will be prevented by the reverse rotation prevention mechanism 50, and thus the master gear shaft 10 will not rotate backward, the engagement between the left screw of the second male threaded member 8b and the second female threaded member 10d will gradually be released, and the handle assembly 1 will be removed from the master gear shaft 10.

When the handle assembly 1 is removed from the master gear shaft 10, the handle assembly 1 will be inserted from the right side of the reel unit 2 to the master gear shaft 10. When this occurs, the first male threaded member 8a of the handle shaft 7c will pass through the first through hole 10a of the master gear shaft 10 and contact with the first female threaded portion 10b. When one rotates the handle assembly 1 in the clockwise direction while grasping the rotor 3 with their hand so that the rotor 3 does not rotate, the first male threaded portion 8a of the handle shaft 7c will screw into the first female threaded portion 10b, and the handle shaft 7c will be fastened to the master gear shaft 10.

Then, the locking member 28 is mounted from the boss 17b side with the handle shaft 7c fastened to the master gear shaft 10, and the first engaged portion 28b is engaged with the first engagement portion 8i. In this state, the cap member 19 is screwed onto the boss 17b. When this occurs, the pressure member 26 presses on the locking member 28 by the coil spring 25. Then, when the handle assembly 1 is further rotated in the clockwise direction, the second engaged portion 28c of the locking member 28 is press fitted and engaged with the second engagement portion 10e, both the handle assembly 1 and the master gear shaft 10 are non-rotatably linked in the release direction, and rotation in the release direction of the handle assembly 1 is prevented. Because of this, it will be difficult for the handle assembly 1 to become loosened when in the engaged state, even if force is applied to the screw in the release direction. In this way, the handle assembly 1 will be mounted to the right side.

During casting, with the handle assembly 1 mounted on the left as shown in FIG. 4, the bail arm 44 is flipped into the line-releasing posture. Thus, the first bail support member 40 and the second bail support member 42 will pivot. In this state, the fishing rod is cast while grasping the fishing line with the index finger of the hand with which the fishing rod is held. When this occurs, the fishing line is released with a high degree of momentum due to the weight of the tackle. In this state, when the handle 1 is, for example, rotated in the line-retrieving direction with the left hand, the rotor 3 rotates in the line-retrieving direction by the master gear 11 and the pinion gear 12 of the rotor drive mechanism 5. Accordingly, the bail arm 44 returns to the line-retrieving posture through a bail flipping mechanism not shown in the figures, and the fishing line is wound around the spool 4.

In this handle assembly 1, the handle shaft 7c includes the tubular main shaft unit 7d in which a space is formed in the interior thereof, the first shaft portion 7e that is mounted on the master gear shaft 10, and the second shaft portion 7f that is mounted on the handle arm 7b. Here, the handle shaft 7c is formed with a space in the interior of the main shaft unit 7d, and thus the handle shaft 7c can be made lighter than a solid handle shaft. In addition, because the handle shaft 7c, has a three piece construction with the main shaft unit 7d, the first shaft portion 7e, and the second shaft portion 7f, the rigidity of the handle shaft 7c can be maintained at a high level while reducing the overall weight of the same by forming the main shaft unit 7d from a light aluminum alloy, and by forming the first shaft portion 7e and the second shaft portion 7f to which comparatively large forces are applied from a high strength stainless steel alloy.

OTHER EMBODIMENTS (a) In the aforementioned embodiment, a spinning reel having a front drag mechanism was described. However, the present invention can also be applied to other types of spinning reels, such as lever-drag types and closed-face types.

(b) In the aforementioned embodiment, the handle assembly 1 was a type in which the handle arm 7b extends in one direction in the radial direction of the handle shaft 7c. However, a handle assembly may be used in which the handle arm extends outward in both radial directions of the handle shaft, and in which knobs are mounted on both ends of the handle arms. In addition, the handle arm may be configured such that it can fold with respect to the handle shaft on the base end thereof.

(c) In the aforementioned embodiments, different male threaded portions were formed on the left and right sides of the handle shaft 7c. However, two handle shafts 107c that have different threaded portions may be provided, such that a handle shaft 107c whose screw direction corresponds to the mounting position of the handle assembly 101 may be mounted.

Figure 9:
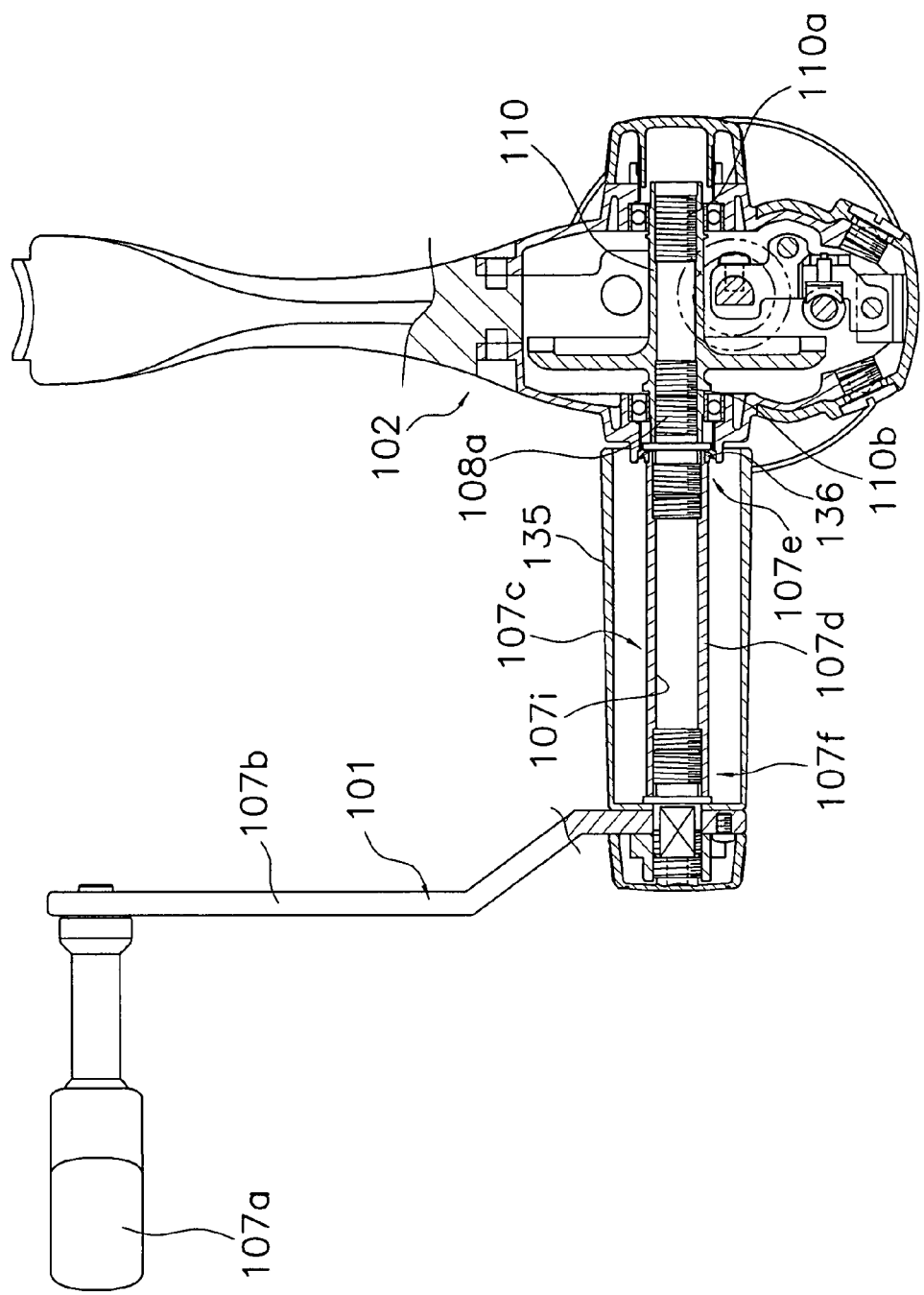
FIG. 9 is a cross-sectional view equivalent to FIG. 2 of the spinning reel in accordance with a second embodiment of the present invention.
Figure 10:
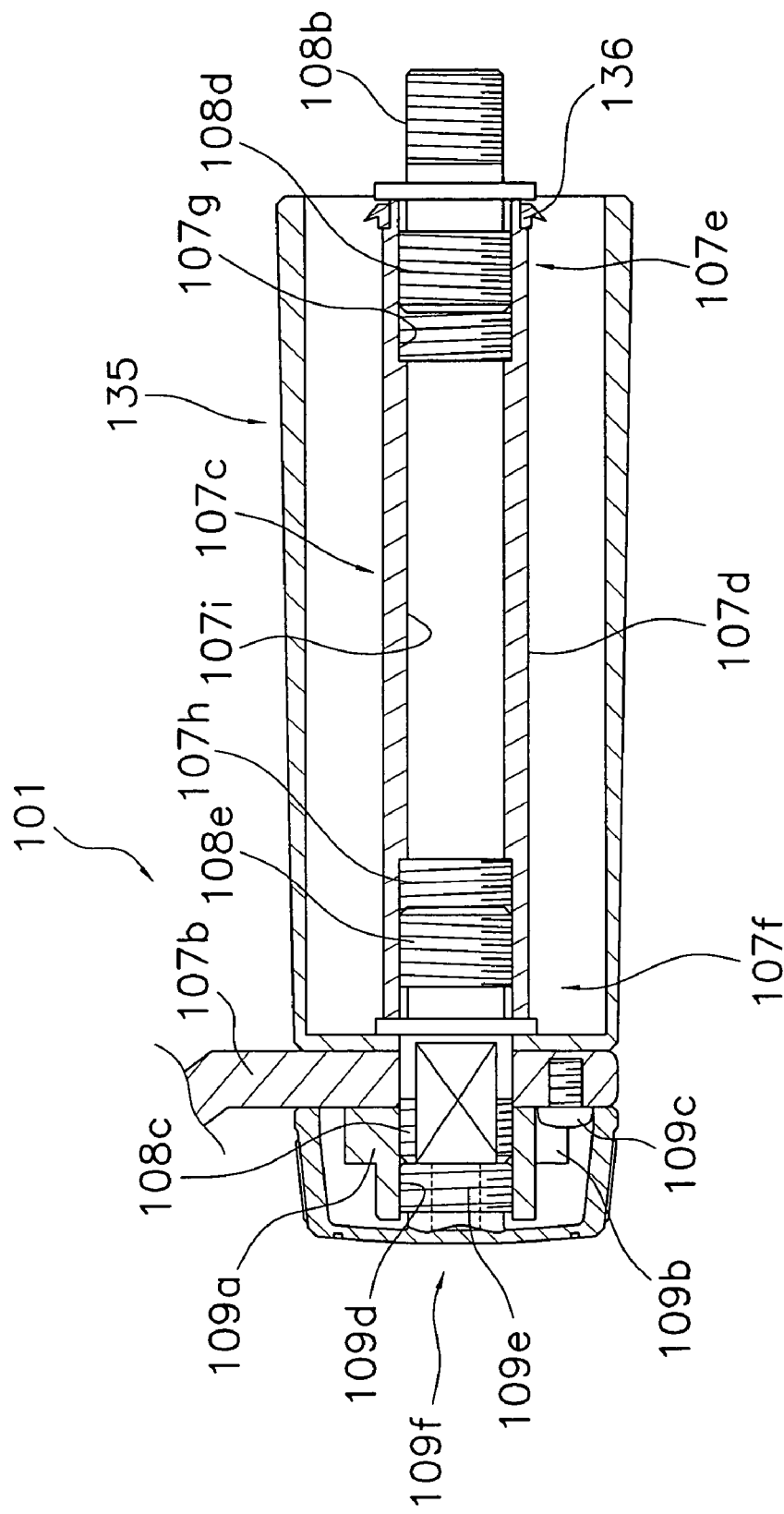
FIG. 10 is a cross-sectional view equivalent to FIG. 7 of the handle shaft of the spinning reel in accordance with the second embodiment of the present invention.

As shown in FIGS. 9 and 10, a handle assembly 101, which is to be mounted to a reel unit 102, includes a right handle shaft (not shown in the figures) and a left handle shaft 107c that are concentrically mounted to a master gear shaft 110 (see FIG. 9), a crank arm 107b that can be detachably mounted to either the right handle shaft or the left handle shaft 107c, and a handle grip 107a that is rotatively mounted to an end of the crank arm 107b.

As shown in FIG. 10, the crank arm 107b is detachably installed on the left handle shaft 107c by a nut member 109a. Thus, the crank arm 107b can be detached from the left handle shaft 107c and attached to the right handle shaft when the handle assembly is to be mounted to the reel unit 102 from the right hand side. A plurality of cut-outs 109b are formed in the outer periphery of the nut member 109a. A screw 109c is inserted into one of these cut-outs 109b, and the rotation of the nut member 109a is prevented by screwing the screw 109c to the crank arm 107b. In addition, a cap member 109f that covers the entire nut member 109a is mounted to the outer periphery of the nut member 109a. A male threaded portion 109e is formed on the end portion of the cap member 109f, and the cap member 109f is fixedly coupled to the nut member 109a by screwing the male threaded portion 109e to a female threaded portion 109d formed on a head portion of the nut member 109a. Note that when the left handle shaft 107c is used, the male threaded portion 109e and the female threaded portion 109d are left screws.

As shown in FIGS. 9 and 10, the left handle shaft 107c is a three piece structure that includes a tubular main shaft unit 107d, a first shaft portion 107e that is screwed onto one end of the main shaft unit 107d and the master gear shaft 110, and a second shaft portion 107f that is mounted on the other end of the main shaft unit 107d and the base of the handle arm 107b.

As shown in FIG. 10, the main shaft unit 107d is a tubular member made of an aluminum alloy that is formed with a hollow space in the interior thereof. The main shaft unit 107d includes a through hole 107i that passes through the interior thereof, and a female threaded portion 107g and a female threaded portion 107h that are respectively formed on both ends of the through hole 107i. The first shaft portion 107e and the second shaft portion 107f are screwed into the female threaded portions 107g, 107h of the main shaft unit 107d by engaging them with male threaded portions 108d, 108e (described below) that are respectively provided in the first shaft portion 107e and the second shaft portion 107f. Note that when the left handle shaft 107c is used, the male threaded portion 108d, 108e and the female threaded portions 107g, 107h are left screws.

The first shaft portion 107e is made of a stainless steel alloy, and as shown in FIG. 10, includes a male threaded portion 108b that is formed on the tip thereof and a male threaded portion 108d that is formed on the base end thereof. The male threaded portion 108b formed on the tip thereof is a left screw, and is screwed into the master gear shaft 10. The male threaded portion 108d formed on the base end thereof is a left screw, and is screwed into the female threaded portion 107g of the main shaft unit 107d. In addition, a seal ring 136 made of a resilient material that seals the gap between the main shaft unit 107d and the reel unit 102 is mounted on a central portion of the outer peripheral surface of the first shaft portion 107e.

The second shaft portion 107f is made of a stainless steel alloy, and as shown in FIG. 10, includes a male threaded portion 108e that is formed on the tip end of the second shaft portion 107f and screws into a female threaded portion 107h of the main shaft unit 107d, and a male threaded portion 108c that is formed on the base end of the second shaft portion 107f. A nut member 109a is screwed onto the male threaded portion 108c.

As shown in FIGS. 9 and 10, a tubular cover member 135 having a bottom portion is mounted around the periphery of the handle shaft 107c. The cover member 135 is made of an aluminum alloy or a synthetic resin, and is mounted to the second shaft portion 107f so that the bottom portion of the cover member 135 is not movable in the axial direction.

As shown in FIG. 9, female threaded portions 110a, 110b are respectively formed on both ends of the master gear shaft 110. The female threaded portion 110a is a right screw, and the male threaded portion of the right handle shaft (not shown in the figures) is screwed therein. The female threaded portion 110b is a left screw, and the male threaded portion 108b of the left handle shaft 107c screws therein.

With this handle assembly 101, like with the aforementioned embodiments, the handle shaft 107c is formed with a space in the interior of the main shaft unit 107d, and thus the handle shaft 107c can be made lighter than a solid handle shaft. In addition, because the handle shaft 107c has a three piece construction with the main shaft unit 107d, the first shaft portion 107e, and the second shaft portion 107f, the rigidity of the handle shaft 107c can be maintained at a high level while reducing the overall weight of the same by forming the main shaft unit 107d from a light aluminum alloy, and by forming the first shaft portion 107e and the second shaft portion 107f to which comparatively large forces are applied from a high strength stainless steel alloy.

Figure 11:
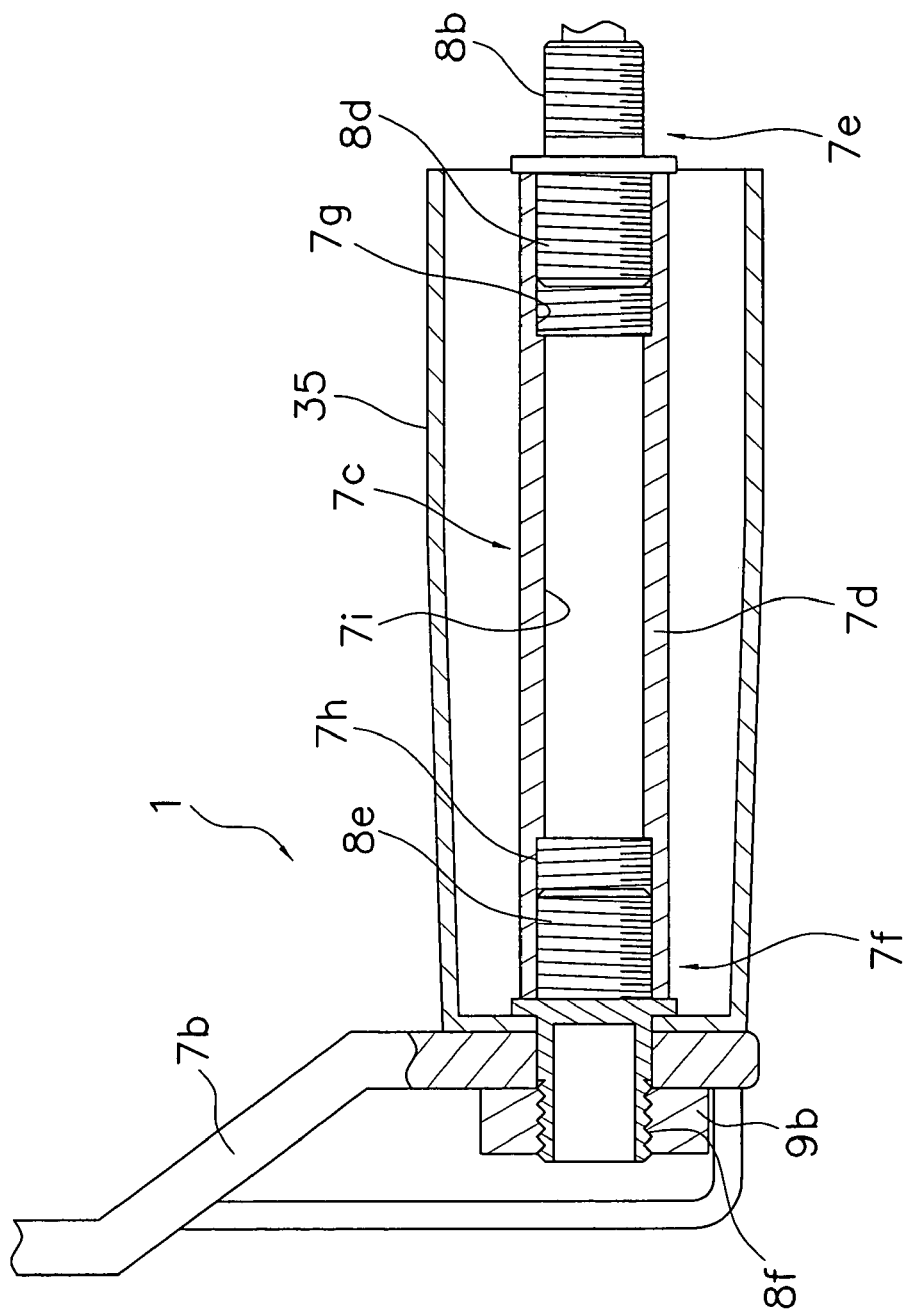
FIG. 11 is a cross-sectional view equivalent to FIG. 7 of the handle shaft of the spinning reel in accordance with a still another embodiment of the present invention.

(d) In the aforementioned embodiment, the handle arm 7b is fixedly coupled to the base end 8c of the handle shaft 7c by the pin member 9a. However, as shown in FIG. 11, a fifth male threaded portion 8f may be formed on the base end of the handle shaft 7c, the handle shaft 7c may pass through the handle arm 7b, and the handle arm 7b may be fixedly coupled to the handle shaft 7c by the nut member 9b alone.

According to the present invention, the handle shaft includes the tubular main shaft unit that has a space formed in the interior thereof, and the first shaft portion and second shaft portion that are to be respectively mounted on the master gear shaft and the handle arm. Thus, the rigidity of the handle shaft can be maintained at a high level while reducing the overall weight of the handle shaft.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-010814. The entire disclosure of Japanese Patent Application No. 2003-010814 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A handle assembly that is detachably screwed onto a master gear shaft of a spinning reel, the handle assembly comprising:
   a handle shaft adapted to be detachably screwed onto a tip of the master gear shaft, the handle shaft being concentrically disposed with the master gear shaft when mounted thereon;
   a handle arm extending from the handle shaft, a base end of the handle arm being mounted to the handle shaft; and
   a handle grip that is mounted to a tip of the handle arm so as to be rotatable around an axis that is approximately parallel to the handle shaft;
   wherein the handle shaft includes a tubular main shaft unit, a first shaft portion that is adapted to be threadedly coupled to one end of the main shaft unit and the tip of the master gear shaft, and a second shaft portion that is adapted to be mounted to the other end of the main shaft unit and the base end of the handle arm.

2. The handle assembly as set forth in claim 1, wherein the main shaft unit is made of an aluminum alloy.

3. The handle assembly as set forth in claim 1, wherein the first shaft portion and the second shaft portion are made of stainless steel.

4. The handle assembly as set forth in claim 1, wherein the second shaft portion is threadedly coupled to the main shaft unit.

5. The handle assembly as set forth in claim 1, further comprising
a tubular cover member having a bottom portion, the bottom portion being mounted to the second shaft portion so as to be axially non-movable relative to the second shaft portion.

6. The handle assembly as set forth in claim 5, wherein the cover member includes slits that are formed along an axial direction of the cover member.

7. The handle assembly as set forth in claim 6, wherein the slits are spaced apart in the circumferential direction of the cover member and provided in a plurality of positions.

8. The handle assembly as set forth in claim 5, wherein the cover member is made of an aluminum alloy.

9. The handle assembly as set forth in claim 5, wherein the cover member is made of a synthetic resin.

10. The handle assembly as set forth in claim 1, wherein the base end of the handle arm is detachably mounted to the handle shaft.

11. The handle assembly as set forth in claim 1, wherein the handle arm is mounted to the handle shaft with a nut member.

12. The handle assembly as set forth in claim 1, wherein the main shaft unit has female threaded portions formed at its ends; and
the first and second shaft portions are shaft members each having a male threaded portion, the male threaded portions of the first and second shaft portions being inserted into the female threaded portions of the main shaft unit.

13. A spinning reel, comprising:
a reel unit having a handle assembly that is detachably screwed onto a master gear shaft;
a rotor rotatively supported on a front of the reel unit; and
a spool disposed on a front of the rotor so as to be movable forward and backward,
the handle assembly including
a handle shaft adapted to be detachably screwed onto a tip of the master gear shaft, the handle shaft being concentrically disposed with the master gear shaft when mounted thereon;
a handle arm extending from the handle shaft, a base end of the handle arm being mounted to the handle shaft; and
a handle grip that is mounted to a tip of the handle arm so as to be rotatable around an axis that is approximately parallel to the handle shaft;
wherein the handle shaft includes a tubular main shaft unit, a first shaft portion that is mounted to one end of the main shaft unit and threadedly coupled to the tip of the master gear shaft, and a second shaft portion that is separately structured from the handle arm, threadedly coupled to the other end of the main shaft unit, and mounted to the base end of the handle arm.

14. The spinning reel as set forth in claim 13, wherein the main shaft unit is made of an aluminum alloy.

15. The spinning reel as set forth in claim 13, wherein the first shaft portion and the second shaft portion are made of stainless steel.

16. The spinning reel as set forth in claim 13, wherein the first shaft portion is threadedly coupled to the main shaft unit.

17. The spinning reel as set forth in claim 13, further comprising
a tubular cover member having a bottom portion, the bottom portion being mounted to the second shaft portion so as to be axially non-movable relative to the second shaft portion.

18. The spinning reel as set forth in claim 17, wherein the cover member includes slits that are formed along an axial direction of the cover member.

19. The spinning reel as set forth in claim 18, wherein the slits are spaced apart in the circumferential direction of the cover member and provided in a plurality of positions.

20. The spinning reel as set forth in claim 17, wherein the cover member is made of an aluminum alloy.

21. The spinning reel as set forth in claim 17, wherein the cover member is made of a synthetic resin.

22. The spinning reel as set forth in claim 13, wherein the base end of the handle arm is detachably mounted to the handle shaft.

23. The spinning reel as set forth in claim 13, wherein the handle arm is mounted to the handle shaft with a nut member.

24. The spinning reel as set forth in claim 13, wherein the main shaft unit has female threaded portions formed at its ends; and
the first and second shaft portions are shaft members each having a male threaded portion, the male threaded portions of the first and second shaft portions being inserted into the female threaded portions of the main shaft unit.

* * * * *